(12) United States Patent
Li et al.

(10) Patent No.: US 7,669,150 B2
(45) Date of Patent: Feb. 23, 2010

(54) STATISTICAL OPTIMIZATION AND DESIGN METHOD FOR ANALOG AND DIGITAL CIRCUITS

(75) Inventors: Xin Li, Pittsburgh, PA (US); Larry Pileggi, Pittsburgh, PA (US)

(73) Assignee: Xigmix, Inc., Pittsburgh, PA (US)

( * ) Notice: Subject to any disclaimer, the term of this patent is extended or adjusted under 35 U.S.C. 154(b) by 344 days.

(21) Appl. No.: 11/245,892

(22) Filed: Oct. 7, 2005

(65) Prior Publication Data
US 2006/0095888 A1 May 4, 2006

Related U.S. Application Data

(60) Provisional application No. 60/623,176, filed on Oct. 29, 2004.

(51) Int. Cl.
G06F 17/50 (2006.01)
G06F 9/45 (2006.01)

(52) U.S. Cl. .............................. 716/2; 716/5
(58) Field of Classification Search .............. 716/2, 716/5
See application file for complete search history.

(56) References Cited

U.S. PATENT DOCUMENTS 6,295,635 B1* 9/2001 Dhaene et al. ............... 716/14
6,615,164 B1* 9/2003 Gopisetty et al. ............. 703/2
2005/0251373 A1* 11/2005 Daems et al. ................. 703/2
2006/0095236 A1* 5/2006 Phillips ....................... 703/2

OTHER PUBLICATIONS

Eeckelaert et al.; "Generalized Posynomial Performance Modeling"; 2003; IEEE; All pages.*
Liu et al.; "Model Order-Reduction of RC(L) Interconnect Including Variational Analysis"; 1999; ACM; All pages.*
Daniel et al.; "A Multiparameter Moment-Matching Model-Reduction Approach for Generating Geometrically Parameterized Interconnect Performance Models"; May 2004; IEEE; All pages.*
Li et al.; "Robust Analog/RF Circuit Design with Projection-Based Posynomial Modeling"; Nov. 2004; IEEE; All Pages.*
Daems et al.; "Simulation-Based Generation of Posynomial Performance Models for the Sizing of Analog Integrated Circuits"; May 2003; IEEE; All pages.*

* cited by examiner

*Primary Examiner*—Jack Chiang
*Assistant Examiner*—Suresh Memula
(74) *Attorney, Agent, or Firm*—Townsend and Townsend and Crew LLP

(57) ABSTRACT

A computer implemented method of performing projection based polynomial fitting. The method includes generating a plurality of sampling points as a function of variables. The method also includes forming a polynomial model template representative of the plurality of sampling points. According to embodiments of the present invention, the polynomial model template comprises at least one polynomial coefficient. The method further includes forming a low-rank matrix to approximate the polynomial coefficient.

16 Claims, 8 Drawing Sheets

STATISTICAL OPTIMIZATION AND DESIGN METHOD FOR ANALOG AND DIGITAL CIRCUITS

CROSS-REFERENCES TO RELATED APPLICATIONS

This application claims priority to U.S. Provisional Application Ser. No. 60/623,176, filed Oct. 29, 2004, entitled "Robust Analog/RF Design with Projection-Based Performance Modeling," the disclosure of which is incorporated herein by reference in its entirety.

BACKGROUND OF THE INVENTION

The present invention relates generally to integrated circuit modeling and optimization techniques. More specifically, the present invention relates to the design of analog/RF and digital circuits based on device level simulation models incorporating process and environmental variations. Merely by way of example, the invention has been applied to statistical analysis and optimization of analog/RF and digital circuits. The methods and techniques can be applied to other applications as well such as MEMS design, radiation hardened circuit design, statistical process control, and the like.

As IC technologies are scaled to finer feature sizes (e.g. deep sub-micron feature sizes) and circuit applications move to higher frequency bands (e.g. radio frequency (RF) applications), analog/RF circuit design faces a variety of challenges. For example, non-ideal effects such as parasitic coupling and process variations may adversely impact circuit performance. As a result, in some cases, to account for these non-ideal effects, the analog/RF circuit design becomes more complicated, increasing the difficulty of understanding the design as well as increasing the difficulty of the design process. Accordingly, manual design of present analog/RF circuits is generally a time-consuming process that requires a significant measure of design experience.

An approach to optimizing analog/RF circuit designs is to apply stochastic search algorithms (e.g. simulated annealing and genetic programming) to circuit sizing. These stochastic search algorithms are generally extremely slow and result in expensive computation costs.

Another approach to optimizing analog/RF circuit designs is to perform circuit sizing based on response surface modeling. According to some of these methods, circuit performance metrics are simulated at a number of sampling points over a local design space. The sampling points are fit as either linear or quadratic polynomial response surface models. These response surface models are used in either a linear or quadratic programming process to determine the optimal design in the local design space. As will be evident to one of skill in the art, linear polynomial response surface models may not be sufficiently accurate and quadratic polynomial response surface models may produce non-optimal solutions when local minimums are present. In addition, building the conventional quadratic models generally requires a great number of sampling points and solves a great number of unknown coefficients, yielding an extremely expensive computation cost.

To obtain globally optimized solutions, another approach used in some analog circuit optimization processes is the approximation of the analog circuit specifications by posynomial functions. As such, analog circuit sizing tasks can be formulated as a geometric programming problem. Given a fixed circuit topology, the circuit performance metrics are approximated as posynomial design equations and then optimized by geometric programming. This process provides a globally optimal solution for the analog circuit sizing problem. However, the conventional geometric programming approaches require the creation of the posynomial design equations by hand. A drawback of such manually derived equations is that this manual process applies various simplifications and may ignore many second-order effects. In order to improve the posynomial modeling accuracy, several algorithms have been proposed to build quadratic posynomial models using numerical simulation data. However, these conventional methods are computationally expensive.

Building conventional quadratic response surface models, both polynomial and posynomial models, requires simulation at a large number of sampling points, resulting in expensive computation costs. Moreover, building these conventional quadratic response surface models entails the solution of a large number of unknown coefficients, also resulting in expensive computation costs. As a result of these drawbacks, conventional response surface modeling approaches are generally only applicable to small and medium size circuit designs.

In some circuit optimization models, process and environmental variations are included in the simulation. Process and environmental variations may be modeled as either corners or random variables. The inclusion of these process variations generally results in an additional increase in the computation cost necessary to determine an optimal solution.

FIG. 1 is a simplified flowchart of a conventional circuit design process. As illustrated in FIG. 1, a design specification is received (110), generally from a circuit designer. The design specification will include a number of parameters, including gain, bandwidth, distortion, power, area, and the like. An initial global search is performed (112) to provide an initial circuit design. Generally, the initial global search utilizes an equation-based optimization process in which selected design variables are assigned optimized values. As will be evident to one of skill in the art, design variables include length and width of metal-oxide semiconductor field effect transistors (MOSFETs), length and width of resistors, lengths and widths of capacitors, and the like. Often, the equation-based optimization processes use simplified equations that can introduce error into the search results.

Local tuning (114) is performed to determine an optimal circuit design based on the results of the initial global search. As discussed above, this step is typically a simulation-based optimization that is either oversimplified to produce a tractable problem or prohibitively expensive in computational terms. Generally, for optimization processes that simulate complex circuit designs, in order to produce results at a reasonable computational cost, non-ideal effects (e.g. parasitic coupling) and process/environmental variations are either not included or included at only a basic level. A final design is produced (116) that may not be globally optimized (e.g. models fit using quadratic polynomials that result in non-convex optimization and local minimums) and/or may not incorporate expected process/environmental variations. Therefore, there is a need in the art for improved methods and apparatus for optimizing the values of design variables for integrated circuit elements in view of process and environmental variations.

SUMMARY OF THE INVENTION

According to the present invention techniques related to integrated circuit modeling and optimization are provided. More specifically, the present invention relates to the design of analog/RF and digital circuits based on device level simulation models incorporating process and environmental variations. Merely by way of example, the invention has been applied to statistical analysis and optimization of analog/RF and digital circuits. The methods and techniques can be applied to other applications as well such as MEMS design, radiation hardened circuit design, statistical process control, and the like.

According to an embodiment of the present invention, a computer implemented method of performing projection based polynomial fitting is provided. The method includes generating a plurality of sampling points as a function of variables and forming a polynomial model template representative of the plurality of sampling points. In a specific embodiment, the polynomial model template comprises at least one polynomial coefficient. The method also includes forming a low-rank matrix to approximate the polynomial coefficient. In some embodiments, forming the low-rank matrix includes using the steps of: (a) determining an initial estimate of a product of a singular value and a singular vector associated with the low-rank matrix, (b) using the determined initial estimate of the product of the singular value and the singular vector to determine a second estimate of the product of the singular value and the singular vector, and (c) repeating steps (a) and (b) until a difference between a first error between the polynomial model template and the plurality of sampling points and a second error between the polynomial model template and the plurality of sampling points is reduced to a predetermined value.

According to another embodiment of the present invention, a computer implemented method of performing projection based posynomial fitting is provided. The method includes generating a plurality of sampling points as a function of design variables and fitting a posynomial equation to the plurality of sampling points. The posynomial equation includes a posynomial coefficient in a specific embodiment. The method also includes forming a low-rank matrix to approximate the posynomial coefficient. In a particular embodiment, approximating the posynomial coefficient includes using the steps of: (a) determining an initial estimate of a product of a singular value and a singular vector associated with the low-rank matrix, (b) using the determined initial estimate of the product of the singular value and the singular vector to determine a second estimate of the product of the singular value and the singular vector, and (c) repeating steps (a) and (b) until a difference between a first error between the polynomial model template and the plurality of sampling points and a second error between the polynomial model template and the plurality of sampling points is reduced to a predetermined value.

According to an alternative embodiment of the present invention, a computer implemented method of measuring a plurality of worst-case circuit performance values is provided. The method includes determining a response surface model associated with a circuit performance specification. The response surface model is a function of at least design variables. The method also includes generating a plurality of non-normal probability distributions based on the response surface model using a close-form model. In an embodiment, each of the plurality of non-normal probability distributions includes a worst-case circuit performance value. Moreover, in a specific embodiment, the close-form model includes an asymptotic probability extraction algorithm.

According to another alternative embodiment of the present invention, a computer implemented method of optimizing a plurality of design variables associated with elements of a circuit design is provided. The method includes determining a first response surface model associated with a circuit performance specification, wherein the first response surface model is a function of at least design variables. The method also includes generating a plurality of non-normal probability distributions based on the first response surface model using a close-form model, wherein each of the plurality of non-normal probability distributions comprises a worst-case performance value. The method further includes generating a plurality of sampling points associated with the worst-case performance values, determining a second response surface model as a function of the plurality of design variables by fitting the plurality of sampling points, and optimizing the plurality of design variables using the second response surface model.

According to a particular embodiment of the present invention, a computer program product stored on a computer-readable storage medium for performing projection based polynomial fitting is provided. The computer program product includes code for generating a plurality of sampling points as a function of variables, code for forming a polynomial model template representative of the plurality of sampling points, wherein the polynomial model template comprises at least one polynomial coefficient, and code for forming a low-rank matrix to approximate the polynomial coefficient.

According to another particular embodiment of the present invention, a computer program product stored on a computer-readable storage medium for performing projection based posynomial fitting is provided. The computer program product includes code for generating a plurality of sampling points as a function of design variables, code for fitting a posynomial equation to the plurality of sampling points, wherein the posynomial equation comprises a posynomial coefficient, and code for forming a low-rank matrix to approximate the posynomial coefficient.

According to yet another particular embodiment of the present invention, a computer program product stored on a computer-readable storage medium for optimizing a plurality of design variables associated with elements of a circuit design is provided. The computer program product includes code for determining a first response surface model associated with a circuit performance specification. The first response surface model is a function of at least design variables. The computer program product also includes code for generating a plurality of non-normal probability distributions based on the first response surface model using a close-form model. Each of the plurality of non-normal probability distributions comprises a worst-case performance value. The computer program product further includes code for generating a plurality of sampling points associated with the worst-case performance values, code for determining a second response surface model as a function of the plurality of design variables by fitting the plurality of sampling points, and code for optimizing the plurality of design variables using the second response surface model.

Many benefits are achieved by way of the present invention over conventional techniques. For example, embodiments of the present invention provide high accuracy response surface (e.g. polynomial and posynomial) models at low computational costs. Additionally, some embodiments of the present invention provide methods of performing statistical analysis using close-form models without the use of Monte Carlo techniques. As will be evident to one of skill in the art, the use of close-form models is generally more computationally efficient than the Monte Carlo techniques. Moreover, convex optimization processes using fitted performance models are provided by embodiments of the present invention, resulting in an increased probability of producing optimized circuit designs at the global minimum. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

According to the present invention techniques related to integrated circuit modeling and optimization are provided. More specifically, the present invention relates to the design of analog/RF and digital circuits based on device level simulation models incorporating process and environmental variations. Merely by way of example, the invention has been applied to statistical analysis and optimization of analog/RF and digital circuits. The methods and techniques can be applied to other applications as well such as MEMS design, radiation hardened circuit design, statistical process control, and the like.

Embodiments of the present invention provide analog/RF design tools that incorporate the impact of process and environmental variations. As device dimensions decrease, for example with sub-100 nm technologies, consideration of the process and environmental variations becomes a critical design concern. Using conventional design techniques lacking the inclusion of process and environmental variations, substantial device sizing may be required to accommodate large-scale variations and provide a sizing for the circuit which will result in an acceptable product yield. Some approaches to including such variations rely on simple optimization schemes (e.g. gradient-based search) and can become stuck at a locally optimal point.

According to embodiments of the present invention, a novel RObust Analog/Digital (ROAD) design tool is provided to post-tune analog/RF circuit designs. In some embodiments, the ROAD tool is referred to as a ROAD optimization method. The ROAD tool incorporates accurate response surface models fitted from transistor-level simulations along with an analysis of large-scale process and environmental variations. The term "robust" conveys the incorporation of process and environmental variations in some embodiments of the present invention. In some embodiments, local tuning of a circuit design is accomplished using the ROAD tool.

Figure 1:
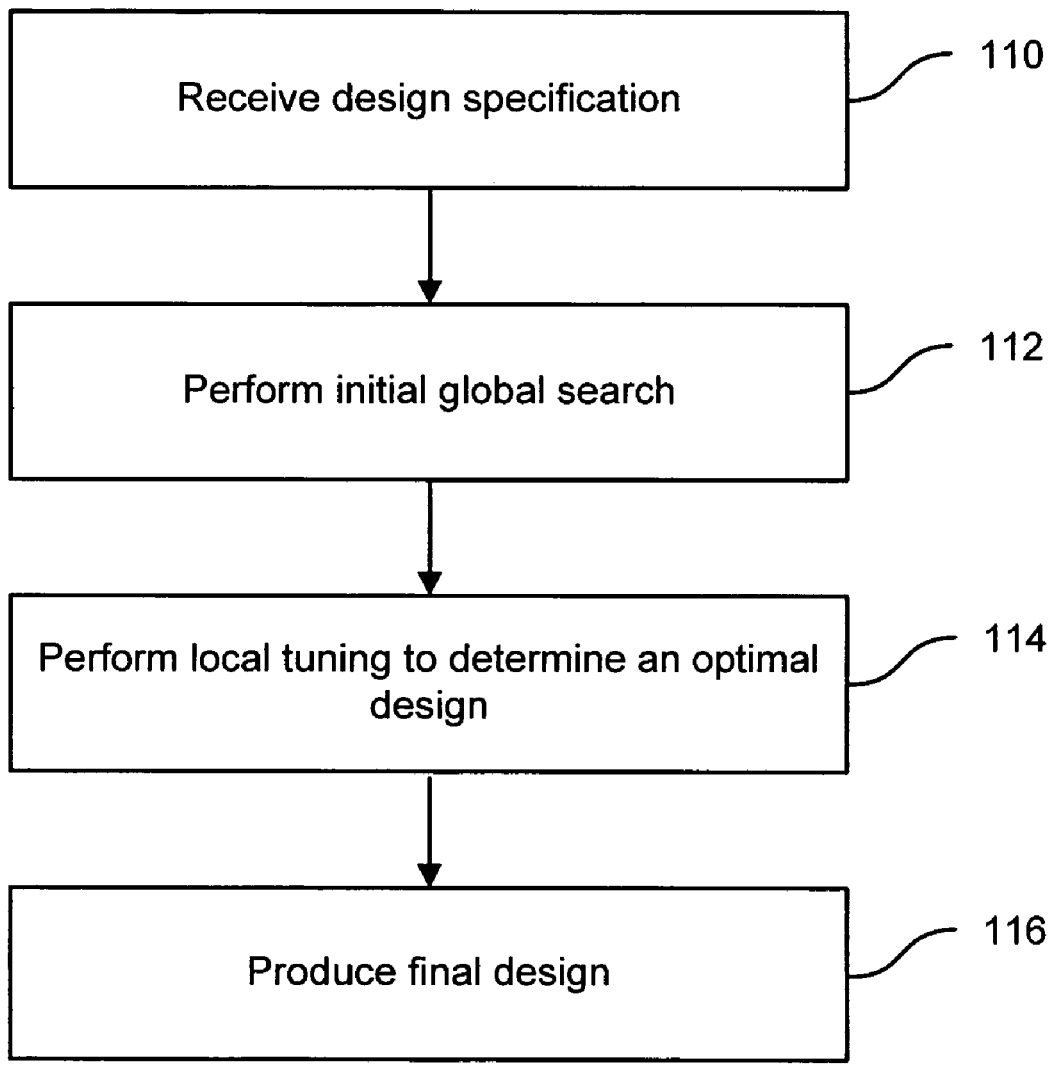
FIG. 1 is a simplified flowchart of a conventional circuit design process.
Figure 2A:
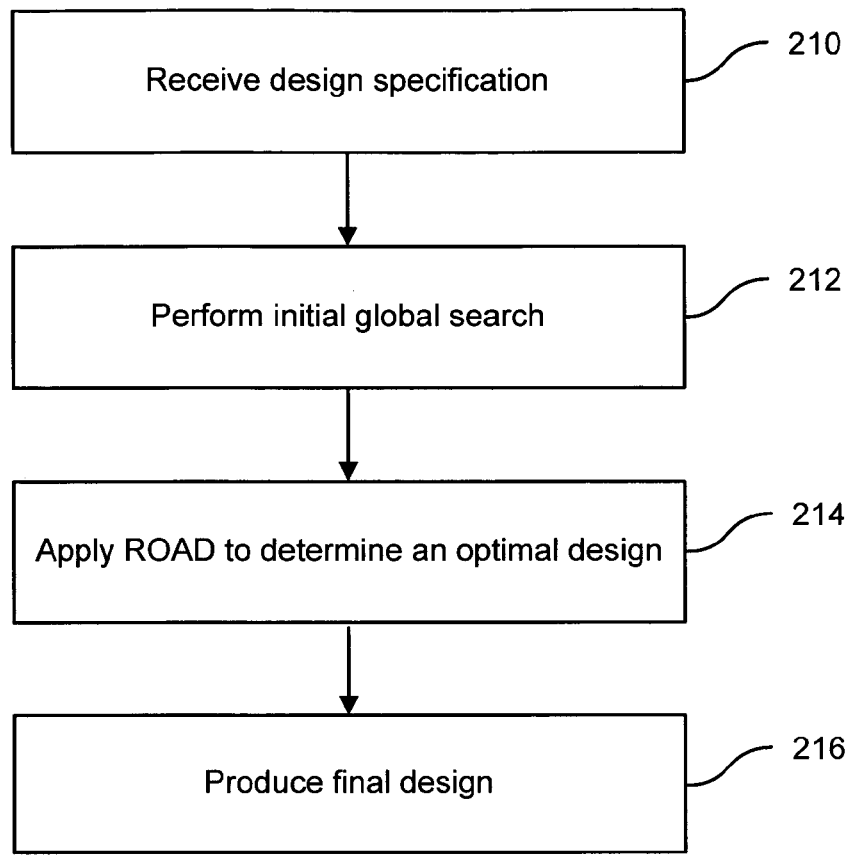
FIG. 2A illustrates a simplified flowchart of a circuit design process according to an embodiment of the present invention.

FIG. 2A is a simplified flowchart of a circuit design process according to an embodiment of the present invention. First, a design specification is received (210). Generally, the design specification is received from a circuit designer or other source. An initial global search is performed (212) to create a nominal design. This nominal design is created by using either a manual analysis process or by an automatic synthesis process using analog optimization algorithms. In some embodiments, simplified device/coupling models are utilized in step 212 to reduce the complexity of the manual design process and/or reduce the time necessary to perform an automatic synthesis. As described more fully below, this initial optimization provides a rapid but coarse search over the entire design space. Then, the ROAD tool is applied (214) including incorporation of detailed device/coupling/variation models to provide a search at increased resolution. Additionally, optimization is performed according to embodiments of the present invention to optimize the tradeoff between device yield and performance. A final design is produced (216) using embodiments of the present invention.

Figure 2B:
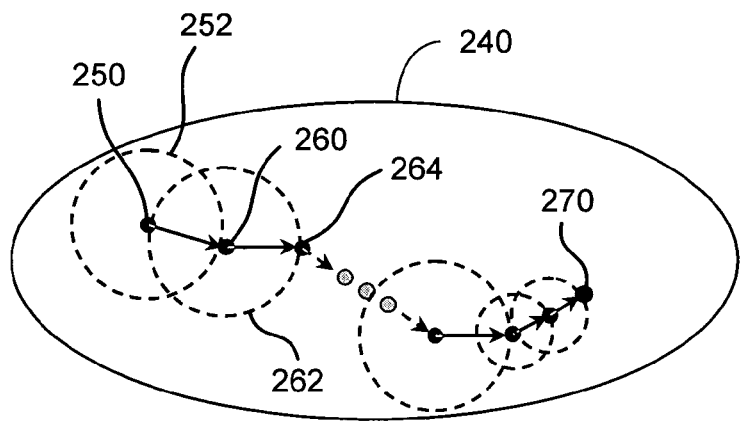
FIG. 2B is a simplified iteration process provided according to embodiments of the present invention.

FIG. 2B illustrates a simplified iteration process provided according to embodiments of the present invention. An initial design is illustrated by initial design point 250 within global design space 240. The dashed circle 252 surrounding the initial design point 250 represents a local design space associated with the initial design space. According to embodiments of the present invention, the design variable values are varied by a predetermined percentage over a range within the local design space. As described below, an optimization process including calculation of the coefficients of a response surface model using a low-rank approximation, worst case analysis including process and environmental variations, posynomial fitting using a low-rank approximation, and geometric programming, is performed to optimize the design in the local design space 252.

As illustrated in FIG. 2B, the optimized design within local design space 252 is represented by reference number 260, which, in turn, has an associated local design space 262. According to embodiments of the present invention, the ROAD tool is utilized to iteratively transition the initial design 250 through a series of progressively optimized designs (e.g., 260, 264, etc.) to an optimized final design 270. Referring to FIG. 2B, the size of the local design spaces decreases as the ROAD method is used to move towards the final optimized design. Using embodiments of the present invention, all desired design constraints, as well as process and environmental variations are incorporated in ROAD using response surface modeling. The accuracy of the response surface model is adaptively controlled by adjusting the local design space size and convergent solutions are determined that provide accurate designs with high product yield.

The above sequence of steps provides a method for optimizing an integrated circuit according to an embodiment of the present invention. As shown, the method uses a combination of steps including a way of using the ROAD tool to iteratively transition an initial design to a final design according to an embodiment of the present invention. Other sequences of steps may also be performed according to alternative embodiments. For example, alternative embodiments of the present invention may perform the steps outlined above in a different order. Moreover, the individual steps illustrated by this figure may include multiple sub-steps that may be performed in various sequences as appropriate to the individual step. Furthermore, other alternatives can also be provided where steps are added, one or more steps are removed, or one or more steps are provided in a different sequence without departing from the scope of the claims herein. One of ordinary skill in the art would recognize many variations, modifications, and alternatives.

Figure 3:
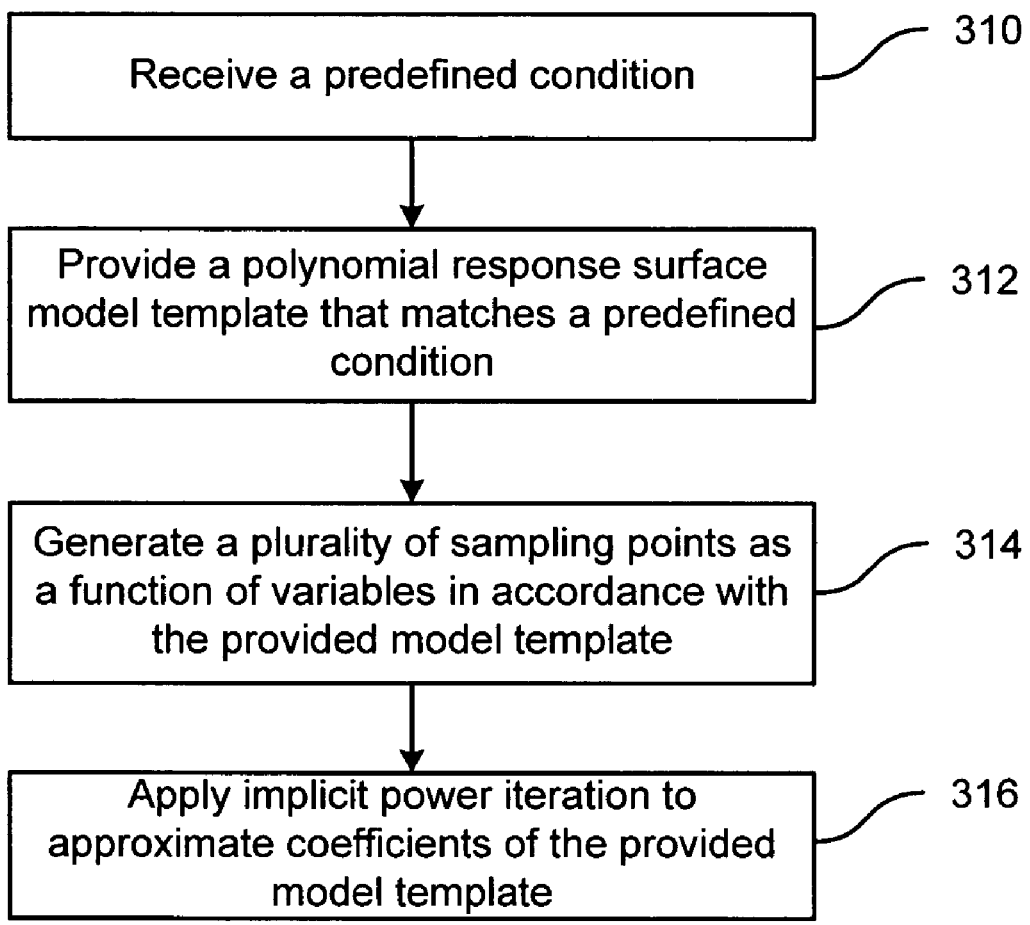
FIG. 3 is simplified flowchart illustrating a method of performing projection based polynomial fitting according to an embodiment of the present invention.

FIG. 3 is simplified flowchart illustrating a method of performing projection based polynomial fitting according to an embodiment of the present invention. As illustrated in FIG. 3, a pre-defined condition is determined (310). For example, the accuracy of the polynomial model or the complexity of the fitting routine are pre-defined conditions. As described below, the particular response surface model template used in embodiments of the present invention will be selected to match the pre-defined condition.

As additionally illustrated in FIG. 3, a polynomial response surface model template is provided (312). According to embodiments of the present invention, the polynomial response surface model template is matched to the pre-defined condition determined in step 310. Merely by way of example, for reduced accuracy results, a linear response surface model may be appropriate. As the accuracy goals are increased, quadratic or higher order models may be utilized. One of ordinary skill in the art would recognize many variations, modifications, and alternatives.

A plurality of sampling points are generated as a function of variables (314) in accordance with the provided model template. In some embodiments, the plurality of sampling points are associated with a response surface model (RSM) template and are calculated as a function of design variables, process parameters, environmental parameters, combinations of these, and the like. Design variables, including, but not limited to transistor width and length, resistor width and length, capacitor width and length, bias current, and the like are included in embodiments of the present invention. Merely by way of example, process parameters comprise process variation and/or environmental parameters comprise environmental variation in some embodiments. Generally, the independent variable of the sampling points is a performance measure, including, but not limited to gain, power consumption, bandwidth, area, distortion, or the like.

According to embodiments of the present invention, the number of sampling points is greater than or equal to the number of unknown model coefficients. Merely by way of example, in the example discussed with relation to FIG. 7, 32 sampling points are utilized. In this example, for each sampling point, a performance value is evaluated for selected values of the input variables. In some embodiments, the input variable values are selected in a random manner. In other embodiments, the input variable values are selected deterministically by using conventional algorithms. Additional details of this process will be demonstrated in relation to the example illustrated with relation to FIG. 7.

In some embodiments, quadratic polynomial models are utilized, although higher-order response surface models, which provide improved modeling accuracy, are included according to embodiments of the present invention.

In general, a quadratic polynomial can be represented by the standard form shown in equation 1:

$$f(X) = X^T A X + B^T X + C, \quad (1)$$

where f represents a circuit performance measure (e.g. power, gain, and the like), $X=[x_1, x_2, \ldots x_n]^T$ contains n variables, and $A \in R^{n \times n}$, $B \in R^n$ and $C \in R$ are the model coefficients, which are unknown.

As will be evident to one of skill in the art, modern circuit designs may include 50 or more variables, resulting in matrix A being on the order of more than 50×50. Conventional algorithms for response surface modeling generate a number of sampling points that represent performance measures as a function of design variables, process parameters, and environmental parameters. These conventional response surface modeling algorithms use the sampling points to solve the set of over-determined linear equations:

$$f_i = X_i^T A X_i + B^T X_i + C \quad (i=1,2,\ldots) \quad (2)$$

where $X_i$ and $f_i$ are the value of X and the exact value of the function $f$ for the i-th simulated sample, respectively. As before, $A \in R^{n \times n}$, $B \in R^n$ and $C \in R^n$ are the unknown model coefficients. As will be evident to one of skill in the art, the number of unknown coefficients in equation 2 is of the order of $O(n^2)$. Therefore, the computational complexity for solving all these coefficients is of the order of $O(n^6)$. This high computation cost limits conventional approaches to small or medium size applications. In contrast, embodiments of the present invention provide methods and systems that reduce the computational cost significantly.

An embodiment of the present invention utilizes a low-rank approximation, the matrix $A_{LR}$, to approximate matrix A and thereby reduce computational cost. A low-rank approximation problem can be stated as follows: given a matrix A, find another matrix $A_{LR}$ with rank p<rank(A) such that their difference $\|A_{LR}-A\|_F$ is minimized. Here, $\|\cdot\|_F$ denotes the Frobenius norm, which is the square root of the sum of the squares of all matrix elements.

From matrix theory, for any matrix $A \in R^{n \times n}$, the optimal rank-p approximation with the least Frobenius-norm error is given by equation 3:

$$A_{LR} = \sum_{i=1}^{p} \lambda_i U_i V_i^T, \quad (3)$$

where $\lambda_i$ is the i-th dominant singular value, $U_i \in R^n$ is the i-th dominant left singular vector and $V_i \in R^n$ is the i-th dominant right singular vector. As will be evident to one of skill in the art, in the special case where the matrix A is symmetric, the low-rank approximation in equation 1 can also be represented by the dominant eigenvalues and eigenvectors, i.e. $\lambda_i$ is the i-th dominant eigenvalue and $U_i = V_i$ are the i-th dominant eigenvectors.

An advantage of the rank-p projection is that, for approximating the matrix $A \in R^{n \times n}$ in equation 1, only $\lambda_i \in R^n$ and $U_i$, $V_i \in R^n$ (i=1,2,\ldots, p) need to be determined, thus reducing the number of unknown coefficients to the order of O(pn). In many modern circuit applications, p is significantly less than n and the number of unknown coefficients that are solved using embodiments of the present invention is almost a linear function of n. Compared with the problem size $O(n^2)$ in conventional approaches, embodiments of the present invention provide increased efficiency and are applicable to large-size problems.

In order to fit the quadratic model, conventional response surface modeling algorithms compute all elements of matrix A, the quadratic coefficient matrix, in equation 1. For many modern circuit designs, matrix A is often sparse and rank-deficient. Accordingly, embodiments of the present invention approximate the matrix A by a rank-one matrix $A_L$, which is given by:

$$A_L = \lambda_1 U_1 V_1^T, \quad (4)$$

where $\lambda_1$ is the first dominant, singular value, $U_1$ is the first dominant left singular vector and $V_1$ is the first dominant right singular vector. As illustrated in FIG. 3, embodiments of the present invention apply an implicit power iteration process (316) to approximate coefficients of the provided model template, thereby approximating the dominant singular vectors of matrix A.

The above sequence of steps provides a method for approximating coefficients of a model template using a low-rank approximation according to an embodiment of the present invention. Other sequences of steps may also be performed according to alternative embodiments. For example, alternative embodiments of the present invention may perform the steps outlined above in a different order. Moreover, the individual steps illustrated by this figure may include multiple sub-steps that may be performed in various sequences as appropriate to the individual step. Furthermore, other alternatives can also be provided where steps are added, one or more steps are removed, or one or more steps are provided in a different sequence without departing from the scope of the claims herein. One of ordinary skill in the art would recognize many variations, modifications, and alternatives.

Figure 4:
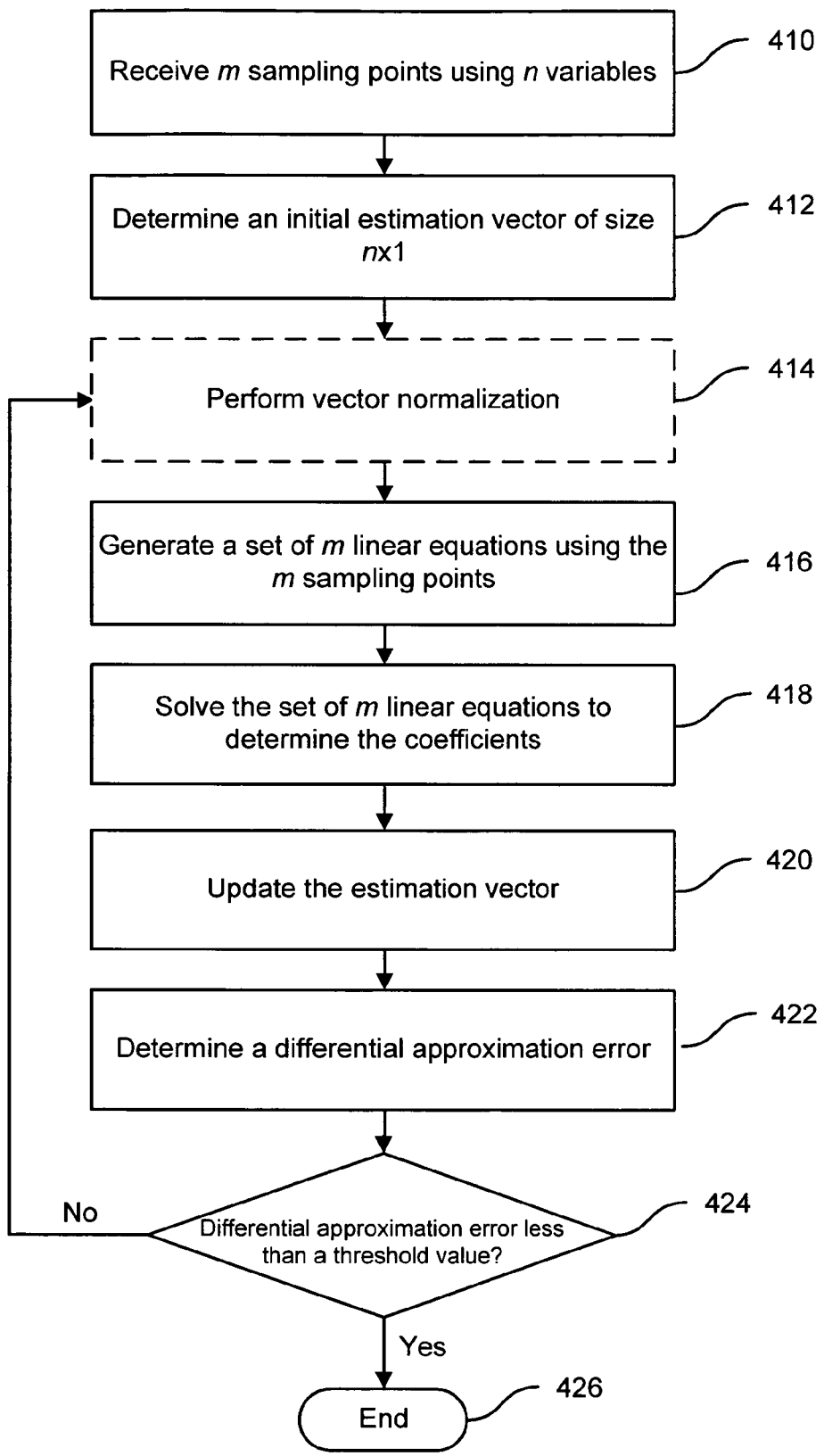
FIG. 4 is simplified flowchart illustrating a method of performing implicit power iteration according to an embodiment of the present invention.

FIG. 4 is simplified flowchart illustrating a method of performing implicit power iteration according to an embodiment of the present invention. As illustrated in FIG. 4, a first number (m) of sampling points are received (410) as discussed in relation to FIG. 3.

An initial column vector is determined (412) with a size equal to the number of variables (n×1). In some embodiments, the initial vector is a vector with random components. In other embodiments, a vector with all components equal to one is utilized. One of ordinary skill in the art would recognize many variations, modifications, and alternatives. The vector is normalized in the optional step (414). In some embodiments, the initial vector is determined so that the vector norm is unity. In this case, no normalization is performed. However, in general, for initial vectors with non-unity norm, normalization is performed. In a specific embodiment, the initial vector is represented by $Q_0$ and the iteration process starts with a value of i=1.

A set of linear equations are provided (416), each of the linear equations associated with at least one of the sampling points. Equation 5 illustrates a linear equation provided to the quadratic polynomial model template, $$f_i = X_i^T (Q_k Q_{k-1}^T) X_i + B_k^T X_i + C_k, \quad (5)$$

where $f_i$ is the exact value of the function $f$ at the i-th simulated sample, i=1,2, ..., m, and k is an iteration counter. As will be evident to one of skill in the art, embodiments of the present invention are not limited to a quadratic model template, but also include higher order polynomial or posynomial models. Embodiments of the present invention are not limited to generating sets of equations with m equations although this number of equations is illustrated in FIG. 4.

For each set of sampling points, an equation is constructed using the variable values ($X_i$) and the performance value ($f_i$). The linear equations also include the unknown coefficients of $Q_k$, $B_k$ and $C_k$. If the number of linear equations is greater than the number of unknown coefficients, the set of linear equations becomes susceptible to solution. Thus, in the embodiment illustrated by equation 5, the exact equation illustrated in equation 2 is approximated in equation 5 by replacing the quadratic coefficient matrix A with the matrix $Q_k Q_{k-1}^T$.

The set of linear equations are solved (418) to determine the unknown coefficients. Upon determining $Q_k$, the counter k is incremented, thereby replacing the initial vector with the updated vector that results from solving the set of linear equations (420). The differential approximation error is determined (422) by evaluating the difference between the exact performance value (f) and the approximate performance value ($\hat{f}$) at successive iterations. Thus, the difference between $f_k$ and $\hat{f}_k$ at the k-th iteration is compared to the difference between $f_{k+1}$ and $\hat{f}_{k+1}$ at the k+1-th iteration, resulting in a differential approximation error. The differential approximation error is compared to a predetermined value (424). In other words, a test is conducted to determine if the iteration has converged.

If the differential approximation error is not less than the predetermined value, the method continues to step 414 at which the updated vector is normalized (414), a set of equations are provided (416), the set of linear equations are solved (418) to determine the next updated vector, etc. Referring to equation 5, the new set of equations incorporates the most recent value of $Q_k$ determined in step 418. If the differential approximation error is less than the predetermined value, the process is terminated (426).

In an embodiment of the present invention, implicit power iteration is used to provide an optimal rank-one approximation $A_L = \lambda_1 U_1 V_1^T = Q_k Q_{k-1}^T$ for the unknown quadratic coefficient matrix A. Using embodiments of the present invention, the power iteration is performed "implicitly" since the value of matrix A is not known, but approximated by the dominant singular value and singular vectors computed using the iterative method illustrated in FIG. 4.

Returning to FIG. 4, after the iteration converges, the response surface model is represented by $$f(X) = X^T \hat{A} X + \hat{B}^T X + \hat{C}, \quad (6)$$

where $\hat{A} = Q_k Q_{k-1}^T$, $\hat{B} = B_k$, and $\hat{C} = C_k$. As described above, k is the final value of the counter used in the implicit power iteration algorithm. The response surface model in equation 6 will be used in FIG. 5 for worst-case analysis.

The above sequence of steps provides a method for performing implicit power iteration according to an embodiment of the present invention. Other sequences of steps may also be performed according to alternative embodiments. For example, alternative embodiments of the present invention may perform the steps outlined above in a different order. Moreover, the individual steps illustrated by this figure may include multiple sub-steps that may be performed in various sequences as appropriate to the individual step. Furthermore, other alternatives can also be provided where steps are added, one or more steps are removed, or one or more steps are provided in a different sequence without departing from the scope of the claims herein. One of ordinary skill in the art would recognize many variations, modifications, and alternatives.

Figure 5:
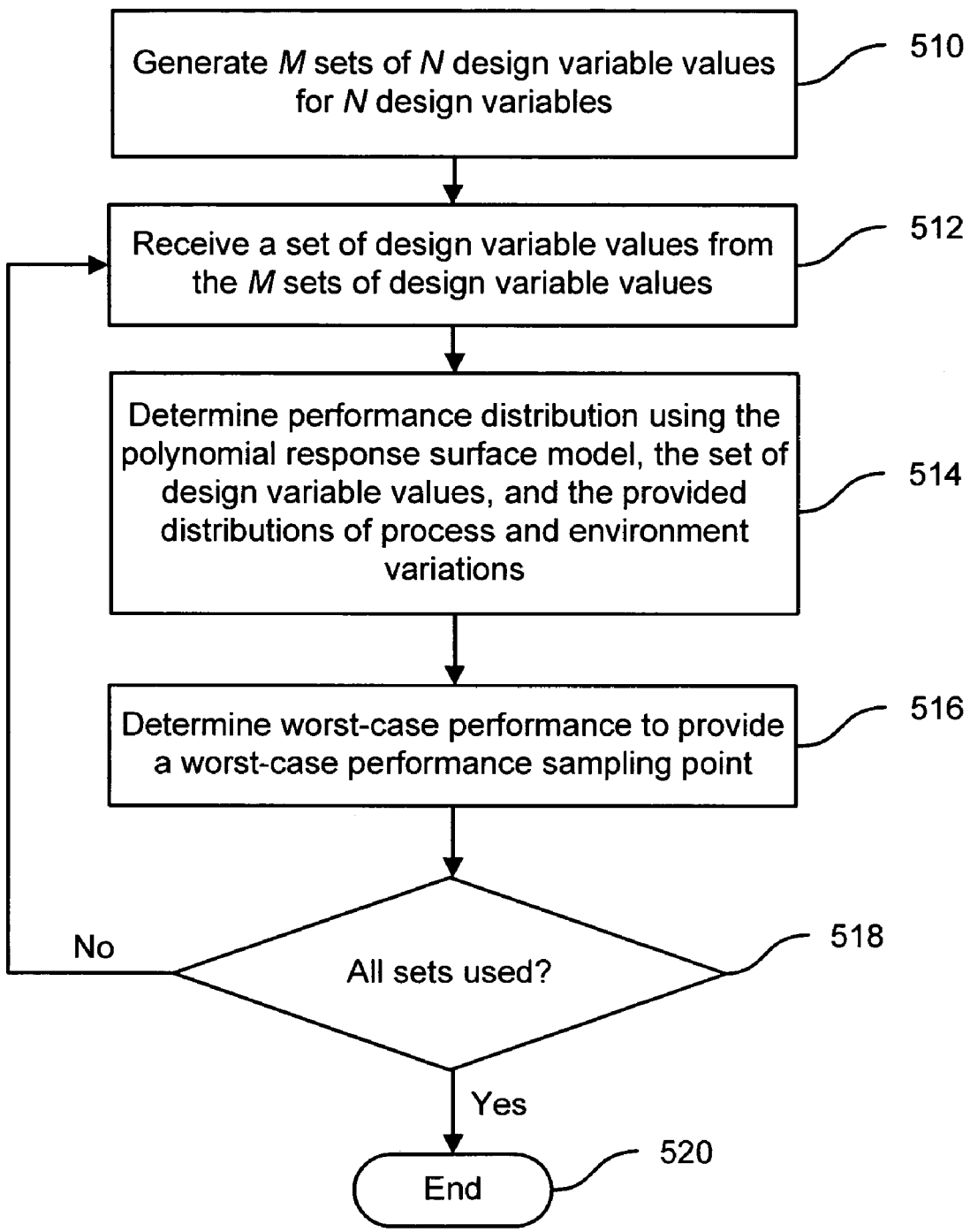
FIG. 5 is a simplified flowchart illustrating a method of performing worst-case analysis according to an embodiment of the present invention.

FIG. 5 is a simplified flowchart illustrating a method of performing worst-case analysis according to an embodiment of the present invention. As illustrated in FIG. 5, M sets of N design variable values are generated using N design variables (510). Merely by way of example, design variables such as the length and width of various transistors, the length and width of various resistors, and the like are utilized according to embodiments of the present invention. Each set of design variable values includes specific deterministic values for each of the N design variables. Conventional algorithms exist to select the design variable values. In some embodiments, the selection is random although this is not required by the present invention. According to embodiments of the present invention, these sets are used to provide particular design variable values used during an iterative process as described below.

Additionally, a plurality of distributions representing variations in process and environmental parameters are provided. Generally, the distributions representing the process and environmental parameters are provided by the foundry and are Normal distributions. Some distributions, such as those associated with resistors and temperature are not necessarily Normal, as will be evident to one of skill in the art. A set of N design variable values are received from the M sets of design variable values (512). Using a set of N particular values of the design variable and the distributions representing the process and environmental variations, the response surface model determined in equation 6 is used to generate an approximated distribution representing the performance variation as a function of the set of particular values of the design variable and the distributions of the process and environmental variations (514). The resulting performance distribution, sometimes referred to as a performance probability density function, is generally a non-Normal distribution.

In some embodiments, a method of estimating the non-Normal probability distribution referred to as APEX is utilized. APEX stands for Asymptotic Probability Extraction for non-Normal distributions. APEX generates a close-form function to approximate the performance probability density function using the moment-matching technique. Additional details regarding APEX are found in "Asymptotic probability extraction for non-Normal distributions of circuit performance," X. Li, J. Le, P. Gopalakrishnan and L. Pileggi, *IEEE/ACM International Conference of Computer Aided Design*, pp. 2-9, 2004, the disclosure of which is incorporated by reference herein for all purposes. The use of APEX provides an alternative methodology to the conventional Monte Carlo simulations typically used to generate the non-Normal distribution. The use of an close-form solution such as APEX results in increase speed for a given accuracy of the result.

Figure 8A:
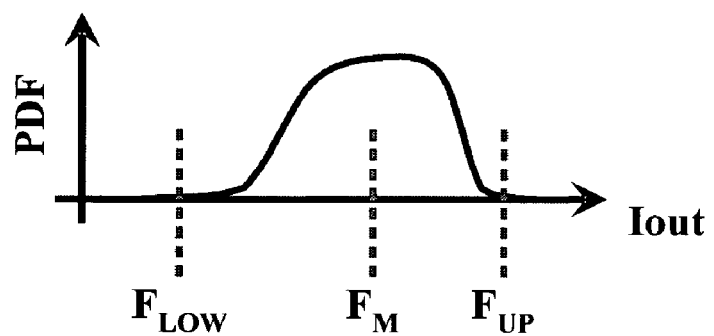
FIGS. 8A and 8B are simplified plots illustrating a probability density function and the cumulative distribution function, respectively, as a function of output current according to an embodiment of the present invention.

In step 516, a worst-case performance value or sampling point is determined. In embodiments of the present invention, instead of handling the complete performance probability density function, we define three important metrics for each circuit performance distribution: the mean value $f_M$, the lower bound $f_{LOW}$, and the upper bound $f_{UP}$, as shown in FIG. 8A. The lower bound $f_{LOW}$ and the upper bound $f_{UP}$ in FIG. 8A are defined as two specific points (e.g. the 1% point and the 99% point respectively) on the cumulative distribution function. However, these particular points are not required by the present invention. In alternative embodiments, other specific points are used to define the lower and upper bounds. In a specific embodiment, the worst case performance value is defined by the value associated with the upper bound $f_{UP}$. In alternative embodiments, the worst case performance value is determined based on the lower bound $f_{LOW}$. In yet other alternative embodiments, the difference between the lower bound $f_{LOW}$ and the upper bound $f_{UP}$ is used to define the worst case performance value.

A determination is made (518) of whether additional sets of the design variable values remain unused in the M sets of design variable values. If additional unused sets remain, the process of receiving a set of design variable values (512), generating a distribution representing the performance variation as a function of the set of particular values of the design variable and the distributions of the process and environmental variations (514), and determining a worst case performance value (516) are repeated until all sets of the design variable values have been used. One of skill in the art will appreciate that tracking of sets as they are used may be implemented among other methods. After all M sets of design variable values have been used, the process is terminated (520). As will be evident to one of skill in the art, a set of worst-case performance sampling points are thus generated as a function of the values of the design variables. Additionally, as will be evident to one of skill in the art, the worst case performance values have the process and environmental variations included.

The above sequence of steps provides a method of performing worst-case analysis according to an embodiment of the present invention. Other sequences of steps may also be performed according to alternative embodiments. For example, alternative embodiments of the present invention may perform the steps outlined above in a different order. Moreover, the individual steps illustrated by this figure may include multiple sub-steps that may be performed in various sequences as appropriate to the individual step. Furthermore, other alternatives can also be provided where steps are added, one or more steps are removed, or one or more steps are provided in a different sequence without departing from the scope of the claims herein. One of ordinary skill in the art would recognize many variations, modifications, and alternatives.

After the plurality of worst case performance values have been determined as described with reference to FIG. 5, it is desirable to generate a response surface model, and particularly a posynomial response surface model. As will be evident to one of skill in the art, posynomial response surface models are log convex and therefore provide optimization solutions that are globally optimal. One conventional approach to this modeling problem is direct fitting of the posynomial model. Direct fitting approximates a posynomial function by the quadratic form:

$$g(X) = \tilde{X}^T \tilde{A} \tilde{X} + \tilde{B}^T \tilde{X} + \tilde{C}, \quad (7)$$

where $\tilde{X} = [x_1^{-1}, x_2^{-1}, \ldots x_N^{-1}, x_2, \ldots, x_N]^T$ includes N independent design variables and $\tilde{A} \in R_+^{2N \times 2N}$, $\tilde{B} \in R_+^{2N}$ and $\tilde{C} \in R_+$ are unknown posynomial coefficients which can be determined by the optimization:

$$\text{minimize} \quad \psi(\tilde{A}, \tilde{B}, \tilde{C}) = \sum_i (\tilde{X}_i^T \tilde{A} \tilde{X}_i + \tilde{B}^T \tilde{X}_i + \tilde{C} - g_i)^2 \quad (8)$$

$$\text{subject to} \quad \tilde{A} \in R_+^{2N \times 2N}, \tilde{B} \in R_+^{2N}, \tilde{C} \in R_+,$$

where $\tilde{X}_i$ and $g_i$ are the value of $\tilde{X}$ and the exact value of the function g for the i-th simulated sample, respectively. Note that, unlike the quadratic polynomial fitting, the coefficient matrices $\tilde{A}$, $\tilde{B}$ and $\tilde{C}$ in equation 8 must be non-negative so that the approximated function in equation 7 is a posynomial. As will be evident to one of skill in the art, the cost function $\psi$ in equation 8 is a positive semi-definite quadratic function restricted to a convex constraint set. Therefore, the optimization problem in equation 8 is convex, providing a globally optimal solution.

Using this conventional approach, as discussed in relation to the fitting of polynomial response surface models, the number of unknown coefficients in equation 7 is of the order of $O(N^2)$. Therefore, the computational complexity for solving all these coefficients is of the order of $O(N^6)$. Embodiments of the present invention provide methods and systems that reduce the computational cost significantly.

Figure 6:
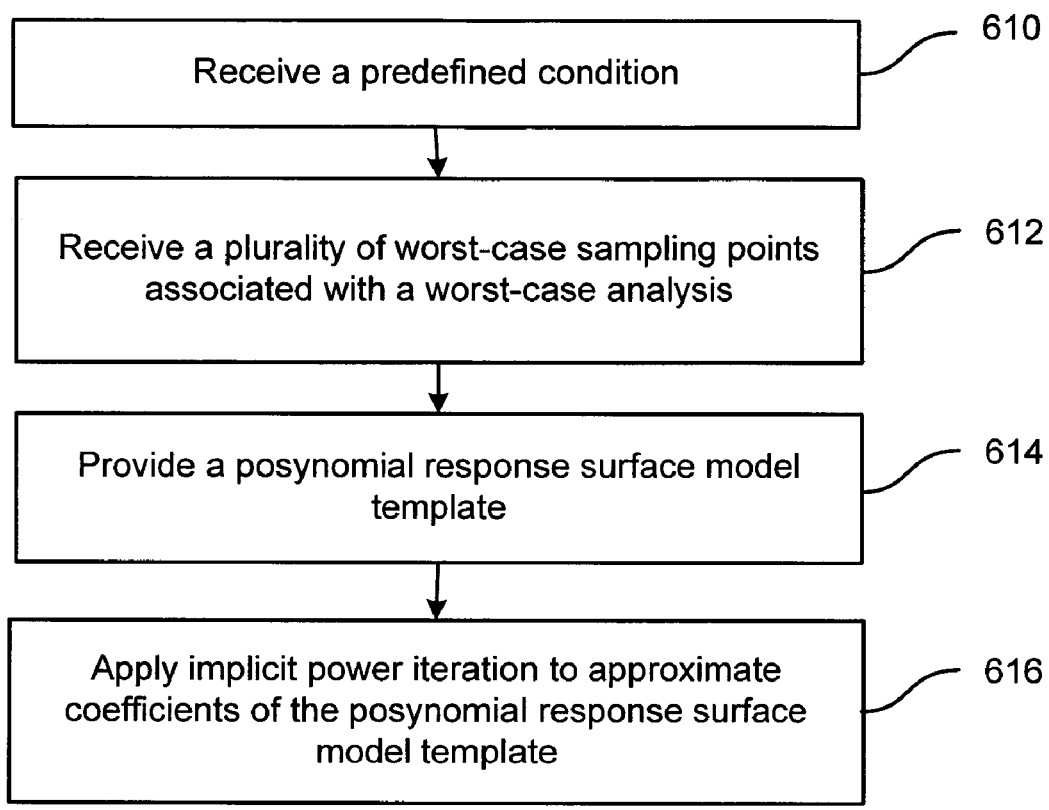
FIG. 6 is a simplified flowchart illustrating the method of performing projection-based posynomial fitting according to an embodiment of the present invention.

FIG. 6 is a simplified flowchart illustrating the method of performing projection-based posynomial fitting according to an embodiment of the present invention. According to embodiments of the present invention, projection based posynomial fitting is performed to provide a posynomial model suitable for optimization using geometric programming. Generally, a predefined condition, for example, an accuracy requirement or a complexity requirement is determined (610). As will be evident to one of skill in the art, tradeoffs exist in determining this predefined condition. A plurality of worst-case sampling points associated with a worst-case analysis are received (612) according to embodiments of the present invention. Then, a posynomial response surface model template that matches a predefined condition is provided (614). In an embodiment, the posynomial response surface model is a quadratic model, although this is not required by the present invention. In alternative embodiments, linear or higher order models are utilized. One of ordinary skill in the art would recognize many variations, modifications, and alternatives.

In step 612, a plurality of sampling points are generated as a function of variables in accordance with the provided model template. According to embodiments of the present invention, the variables are design variables as discussed previously. The plurality of sampling points are generated in some embodiments during the worst case analysis discussed in relation to FIG. 5. In an exemplary embodiment, a modified implicit power iteration method is applied (616) to approximate coefficients of the posynomial response surface model.

An initial vector is determined, wherein the elements of the initial vector are all positive (e.g., $Q_0 \in R_+^{2N}$). A counter is set to an initial value (e.g., k=1). In an optional step, the initial vector is normalized by using the following normalization calculation: $Q_{k-1} = Q_{k-1}/\|Q_{k-1}\|_2$. As discussed in relation to the implicit power iteration method previously, the initial vector can be determined with unity norm, in which case a normalization step is not used. The convex quadratic programming is solved:

$$\text{minimize} \quad \psi_k(Q_k, B_k, C_k) = \sum_i \left( \tilde{X}_i^T Q_k Q_{k-1}^T \tilde{X}_i + B_k^T \tilde{X}_i + C_k - g_i \right)^2 \quad (9)$$

$$\text{subject to} \quad Q_k \in R_+^{2N}, B_k \in R_+^{2N}, C_k \in R_+,$$

where $\psi$ is the error measure, $Q_{k-1}$ is the vector determined in the previous implicit power iteration step, $Q_k$, $B_k$ and $C_k$ are unknown coefficients, and g is the worst-case performance value. The counter k is used during the iteration and i represents the index of the sampling points.

After the solution is obtained, an updated convex quadratic programming is generated using the current solution. Accordingly, the normalization and the convex quadratic programming are performed iteratively, incrementing k until $$|\psi_k^{min}(Q_k, B_k, C_k) - \psi_{k-1}^{min}(Q_{k-1}, B_{k-1}, C_{k-1})| < \epsilon, \quad (10)$$

where $\epsilon$ is the pre-defined error tolerance. The iteration process is continued until the difference between the error measured in two successive iterations is reduced below the pre-defined error tolerance $\epsilon$. Upon completion of the iteration, the following approximate posynomial model is provided:

$$\hat{g}(X) = \tilde{X}^T Q_k Q_{k-1}^T \tilde{X} + B_k^T \tilde{X} + C_k. \quad (11)$$

The above sequence of steps provides a method of performing projection-based posynomial fitting according to an embodiment of the present invention. Other sequences of steps may also be performed according to alternative embodiments. For example, alternative embodiments of the present invention may perform the steps outlined above in a different order. Moreover, the individual steps illustrated by this figure may include multiple sub-steps that may be performed in various sequences as appropriate to the individual step. Furthermore, other alternatives can also be provided where steps are added, one or more steps are removed, or one or more steps are provided in a different sequence without departing from the scope of the claims herein. One of ordinary skill in the art would recognize many variations, modifications, and alternatives.

Posynomial fitting is performed for each performance specification. Generally, the performance specifications are provided by the circuit designers, although this is not required by the present invention. Accordingly, the processes starting with polynomial fitting, worst case analysis, and posynomial fitting are repeated for each of the selected performance specifications.

Using the posynomial models associated with each of the performance specifications, the optimization is formulated using conventional techniques. As will be evident to one of skill in the art, the cost function can be a weighted sum of all performance specifications:

$$\text{minimize} \sum_i \alpha_i \hat{g}_i(X). \quad (12)$$

where $\alpha_i$ and $\hat{g}_i(X)$ are the weight and the approximated posynomial model for the i-th worst-case performance measure, respectively. Additionally, a single performance specification can be optimized subject to boundaries for other performance specifications:

minimize $\hat{g}_0(X)$ $$\text{subject to } \hat{g}_i(X) \leq \beta_i \, (i=1,2,\ldots)' \quad (13)$$

where $\hat{g}_0(X)$ is the approximated posynomial model for the worst-case performance measure that should be minimized, and $\hat{g}_i(X)$ is the approximated posynomial model for the i-th worst-case performance measure that should be smaller than the pre-defined value $\beta_i$. $\beta_i$ is generally received from a circuit designer or other source. One of ordinary skill in the art would recognize many variations, modifications, and alternatives.

Finally, based on these extracted posynomial performance models, geometric programming is applied to optimize the design variables $X=[x_1, x_2, \ldots, x_N]^T$. As will be evident to one of skill in the art, many conventional optimization algorithms (e.g. the interior-point method) can be applied to solve the geometric programming.

As discussed in relation to FIG. 2B, the aforementioned optimization process including calculation of the coefficients of a response surface model using a low-rank approximation, worst case analysis including process and environmental variations, posynomial fitting using a low-rank approximation, and geometric programming that is performed iteratively until convergence is reached. In some embodiments, the cost function value after geometric programming is compared with a pre-defined tolerance. If the cost function value is smaller than the tolerance, convergence is detected and the iteration is stopped. In other embodiments, the difference between the cost function value in the previous iteration and the cost function value in the present iteration is compared with a pre-defined tolerance. If the difference is smaller than the tolerance, convergence is detected and the iteration is stopped. One of ordinary skill in the art would recognize many variations, modifications, and alternatives.

As discussed in relation to FIG. 2B, the size of the local design space is decreased as successive iterations of the ROAD method are performed. As the local design space decreases in size, the accuracy of the polynomial and posynomial fitting becomes more accurate. As a result, the optimal design for each design space increases in accuracy as ROAD iterations are performed.

Figure 7:
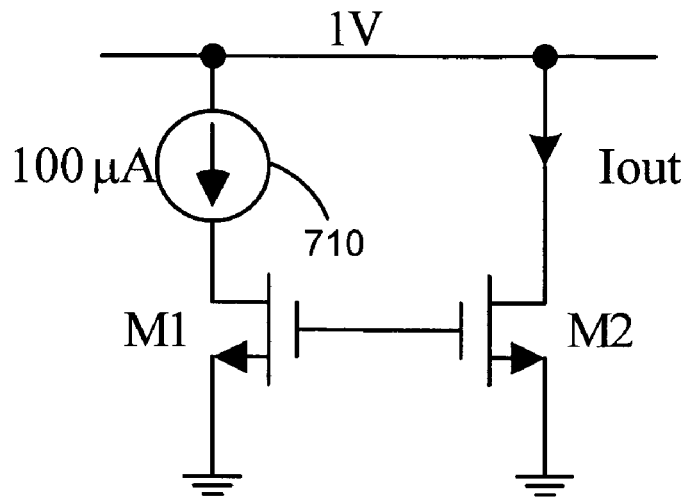
FIG. 7 is a simplified circuit schematic illustrating a current mirror.

FIG. 7 is a simplified circuit schematic illustrating a current mirror. Utilizing this current mirror, an exemplary embodiment of the present invention is illustrated. As will be evident to one of skill in the art, this simplified example is provided merely for purposes of illustration and is not intended to limit the scope of the present invention. The current mirror consists of three basic components: an ideal current source 710 (100 µA) and two MOS transistors M1 and M2. The output current Iout is illustrated in FIG. 7. In the current mirror illustrated in FIG. 7, the transistor width and length are design variables that are to be optimized. For purposes of clarity, it is assumed that M1 and M2 have the same transistor width (W) and length (L).

For purposes of clarity and simplicity, global inter-die variations are ignored in optimizing the current mirror illustrated in FIG. 7. The only process variation that is considered is the mismatch of the threshold voltage ($V_{th}$). As will be evident to one of skill in the art, the values of $V_{th}$ for M1 and M2 are not exactly identical due to manufacturing variations. To model such a $V_{th}$ mismatch, the $V_{th}$ of M1 is represented as $V_{thNom}+\Delta V_{th1}$ and the $V_{th}$ of M2 is represented as $V_{thNom}+\Delta V_{th2}$, where $V_{thNom}$ stands for the nominal $V_{th}$ value that is identical for both M1 and M2, and $\Delta V_{th1}$ and $\Delta V_{th2}$ are random variables used to model the mismatch. The additional assumption that $\Delta V_{th1}$ and $\Delta V_{th2}$ are statistically independent and normal distributions with a mean value of zero and a standard deviation of 0.0333.

Figure 8B:
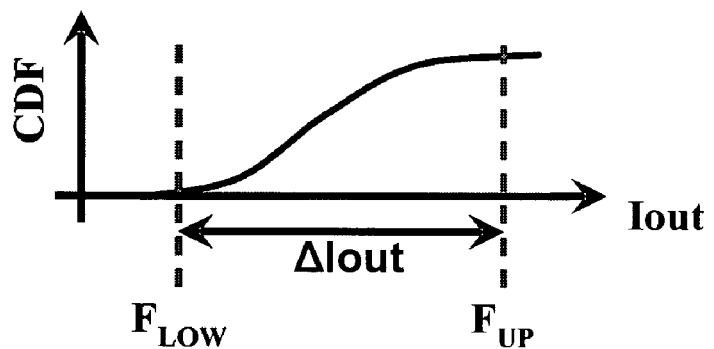

The output current Iout is the performance measure of interest for purposes of this example. FIGS. 8A and 8B are simplified plots illustrating a probability density function and the cumulative distribution function, respectively, as a function of output current according to an embodiment of the present invention. When the random mismatch on $V_{th}$ is considered, Iout is not a deterministic value, but is modeled as a random variable as illustrated in FIG. 8A. In this example, we are especially interested in the variation of Iout, which is denoted as ΔIout. We define ΔIout as the distance between the 99% point and the 1% point of the cumulative distribution function (CDF), as shown in FIG. 8B. Minimizing ΔIout is the objective of this design example. Table 1 summarizes the design variables, process variations, circuit 15 performance measures and design objectives related to the current mirror illustrated in FIG. 7.

TABLE 1

| Type | Name | Description |
|---|---|---|
| Design Variable | W | Transistor width (M1 and M2 have identical width) |
| | L | Transistor length (M1 and M2 have identical length) |
| Process Variation | $\Delta V_{th1}$ | $V_{th}$ mismatch of M1 |
| | $\Delta V_{th2}$ | $V_{th}$ mismatch of M2 |
| Circuit Performance | Iout | Output current |
| | ΔIout | Variation of output current (defined by 1% and 99% points on CDF) |
| Design Objective | | Minimize ΔIout |

Typically, the designer specifies the initial values of all design variables. This initial setup is called an initial design. For purposes of illustration, the initial values of both W and L are set equal to 0.2 µm, as shown in Table 2.

TABLE 2

| Name | Value |
|---|---|
| W | 0.2 µm |
| L | 0.2 µm |

Starting from the initial design, a local design space is designed that covers ±10% perturbation of the design variables (i.e., W ∈ [0.18 µm, 0.22 µm] and L ∈ [0.18 µm, 0.22 µm]). One of ordinary skill in the art will appreciate that the size of the initial design space can be set to other values (e.g., ±20%, ±5%, etc.), depending on the requirement of different design applications.

Figure 9:
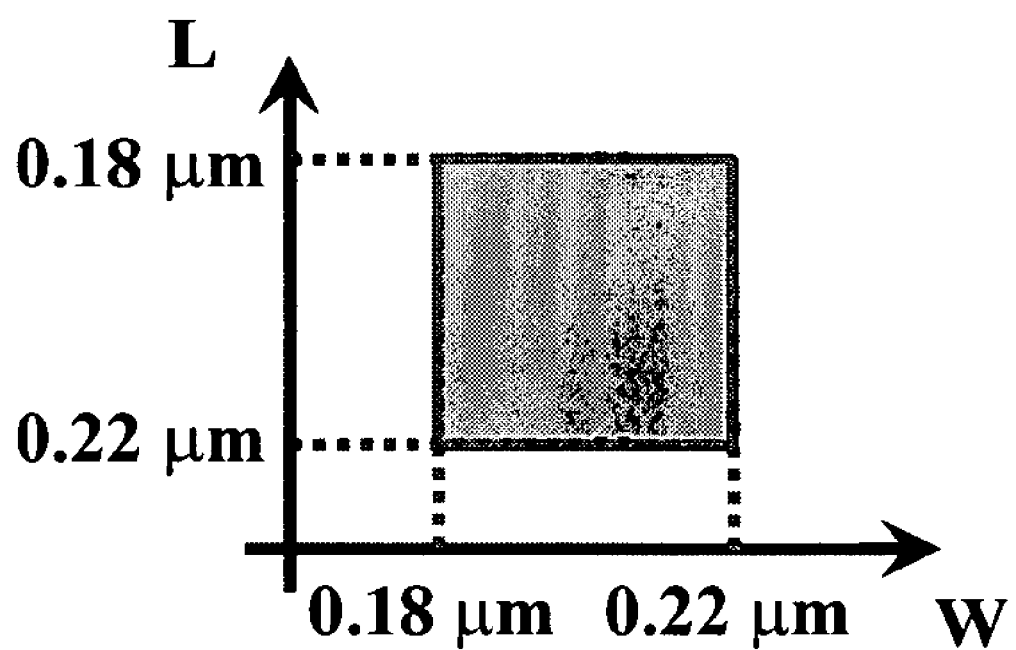
FIG. 9 is a simplified plot illustrating a local design space.

For purposes of this example, 32 sampling points for the design variables W and L are randomly selected over the range of design space values illustrated in FIG. 9. Additionally, 32 sampling points for the process parameters $\Delta V_{th1}$ and $\Delta V_{th2}$ are randomly selected according to their probably distributions. Table 3 lists the selected sampling points for W, L, $\Delta V_{th1}$, and $\Delta V_{th2}$. A circuit simulation is run to compute the Iout value for all 32 sampling points.

Table 3 lists the results of this simulation in the last column. One of skill in the art will appreciate that the selection of 32 sampling points is merely an example and it not intended to limit the present invention. Alternative embodiments of the present invention utilize a greater or lesser number of sampling points depending on the particular applications.

TABLE 3

| Index | W (m) | L (m) | $\Delta V_{th1}$ (V) | $\Delta V_{th2}$ (V) | Iout (A) |
|---|---|---|---|---|---|
| 1 | 1.9451E−07 | 1.8395E−07 | 3.2814E−02 | −5.8554E−02 | 5.8976E−05 |
| 2 | 2.1025E−07 | 1.9777E−07 | −2.0588E−02 | 1.1048E−02 | 1.3425E−04 |
| 3 | 2.0600E−07 | 1.9011E−07 | −9.7402E−02 | 7.9722E−02 | 2.5295E−04 |
| 4 | 2.1404E−07 | 2.0958E−07 | 3.0297E−02 | −8.5825E−02 | 5.3566E−05 |
| 5 | 1.9931E−07 | 1.9590E−07 | 5.5465E−02 | −1.1209E−02 | 7.3398E−05 |
| 6 | 1.8671E−07 | 2.0315E−07 | 8.0224E−02 | 1.4093E−02 | 7.4037E−05 |
| 7 | 2.1811E−07 | 1.9704E−07 | 6.2034E−02 | 9.4061E−02 | 1.3214E−04 |
| 8 | 2.1511E−07 | 1.8006E−07 | 4.9671E−02 | −1.5760E−02 | 7.2141E−05 |
| 9 | 1.8285E−07 | 1.9171E−07 | 9.2648E−02 | −4.5250E−02 | 3.9545E−05 |
| 10 | 2.1174E−07 | 2.1857E−07 | 2.0014E−02 | 8.9170E−02 | 1.5299E−04 |
| 11 | 2.0470E−07 | 2.1748E−07 | 7.0896E−02 | −2.4796E−02 | 6.3050E−05 |
| 12 | 1.9650E−07 | 2.0733E−07 | 9.6002E−02 | −9.8497E−02 | 2.5434E−05 |
| 13 | 2.0325E−07 | 1.8605E−07 | 1.1916E−02 | −3.8343E−02 | 8.1961E−05 |
| 14 | 1.9111E−07 | 2.0859E−07 | −3.4501E−02 | 2.4511E−02 | 1.4976E−04 |
| 15 | 2.0973E−07 | 2.0000E−07 | −7.5436E−02 | 8.6220E−02 | 2.3120E−04 |
| 16 | 1.9145E−07 | 1.8936E−07 | 4.0866E−02 | −6.7622E−02 | 5.1886E−05 |
| 17 | 1.9838E−07 | 2.0548E−07 | 6.5166E−02 | 5.7777E−02 | 1.0646E−04 |
| 18 | 1.8810E−07 | 1.8170E−07 | −8.1574E−02 | 5.2637E−03 | 1.8100E−04 |

TABLE 3-continued

| Index | W (m) | L (m) | $\Delta V_{th1}$ (V) | $\Delta V_{th2}$ (V) | Iout (A) |
|---|---|---|---|---|---|
| 19 | 1.8503E-07 | 1.9438E-07 | -6.2499E-03 | -1.2770E-03 | 1.1575E-04 |
| 20 | 1.8904E-07 | 2.1338E-07 | -5.5562E-02 | -5.0784E-02 | 1.1621E-04 |
| 21 | 2.0154E-07 | 2.1059E-07 | -1.8736E-02 | 7.4661E-02 | 1.7196E-04 |
| 22 | 1.9514E-07 | 1.8700E-07 | -6.7940E-02 | -7.5451E-02 | 1.1030E-04 |
| 23 | 1.8456E-07 | 1.8340E-07 | 1.8724E-02 | 3.1731E-02 | 1.2106E-04 |
| 24 | 2.1260E-07 | 2.1399E-07 | -4.7461E-02 | -8.8626E-02 | 9.1010E-05 |
| 25 | 1.8006E-07 | 1.8866E-07 | -3.8519E-02 | -2.7448E-02 | 1.2101E-04 |
| 26 | 1.8239E-07 | 2.0434E-07 | -6.1956E-02 | 6.3626E-02 | 1.9756E-04 |
| 27 | 2.0042E-07 | 2.1976E-07 | -8.9743E-02 | 5.2796E-02 | 2.0495E-04 |
| 28 | 2.0831E-07 | 1.9889E-07 | -9.8713E-03 | 4.7171E-02 | 1.5074E-04 |
| 29 | 2.1998E-07 | 2.0242E-07 | -7.3045E-02 | -3.1872E-02 | 1.4216E-04 |
| 30 | 2.1742E-07 | 2.1193E-07 | 2.9324E-03 | -7.3482E-02 | 7.2150E-05 |
| 31 | 2.0629E-07 | 1.9345E-07 | -2.6902E-02 | 2.5048E-02 | 1.4911E-04 |
| 32 | 1.9269E-07 | 2.1512E-07 | 8.3893E-02 | 3.8265E-02 | 8.5753E-05 |

Given the sampling points illustrated in Table 3, implicit power iteration, as described above, is used to fit an approximated, rank-one quadratic polynomial function for Iout, i.e.:

$$\hat{I}_{out} = \hat{f}(W, L, \Delta V_{th1}, \Delta V_{th2}) = \begin{bmatrix} W \\ L \\ \Delta V_{th1} \\ \Delta V_{th2} \end{bmatrix}^T \cdot Q_k Q_{k-1}^T \cdot \begin{bmatrix} W \\ L \\ \Delta V_{th1} \\ \Delta V_{th2} \end{bmatrix} + B_k^T \cdot \begin{bmatrix} W \\ L \\ \Delta V_{th1} \\ \Delta V_{th2} \end{bmatrix} + C_k \quad (14)$$

In this example, the total number of design variables and process parameters is equal to four. Therefore, an initial vector $Q_0 \in R^{4 \times 1}$ is selected as the initial vector for the implicit power iteration process. For purposes of illustration, we select:

$$Q_0 = \begin{bmatrix} 1 \\ 1 \\ 1 \\ 1 \end{bmatrix} \quad (15)$$

After the first implicit power iteration, the calculated values for the coefficients are:

$$Q_0 = \begin{bmatrix} +5.00 \times 10^{-1} \\ +5.00 \times 10^{-1} \\ +5.00 \times 10^{-1} \\ +5.00 \times 10^{-1} \end{bmatrix}, Q_1 = \begin{bmatrix} +8.85 \times 10^{+2} \\ +1.55 \times 10^{+3} \\ -3.53 \times 10^{-5} \\ -1.76 \times 10^{-3} \end{bmatrix}, \quad (16)$$

$$B_1 = \begin{bmatrix} +1.41 \times 10^{+2} \\ +5.56 \times 10^{+1} \\ -8.78 \times 10^{-4} \\ +3.43 \times 10^{-4} \end{bmatrix}, C_1 = 8.13 \times 10^{-5}$$

After the second implicit power iteration, the calculated values for the coefficients are:

$$Q_1 = \begin{bmatrix} +4.94 \times 10^{-1} \\ +8.69 \times 10^{-1} \\ -1.97 \times 10^{-8} \\ -9.83 \times 10^{-7} \end{bmatrix}, Q_2 = \begin{bmatrix} -2.11 \times 10^{+9} \\ +3.92 \times 10^{+9} \\ +1.78 \times 10^{+3} \\ -7.33 \times 10^{+2} \end{bmatrix}, \quad (17)$$

$$B_2 = \begin{bmatrix} +3.64 \times 10^{+2} \\ -1.42 \times 10^{+2} \\ -1.10 \times 10^{-3} \\ +1.16 \times 10^{-3} \end{bmatrix}, C_2 = 2.27 \times 10^{-4}$$

After the third implicit power iteration, the calculated values for the coefficients are:

$$Q_2 = \begin{bmatrix} -4.74 \times 10^{-1} \\ +8.80 \times 10^{-1} \\ +3.99 \times 10^{-7} \\ -1.64 \times 10^{-7} \end{bmatrix}, Q_3 = \begin{bmatrix} +1.03 \times 10^{+9} \\ +4.37 \times 10^{+9} \\ +1.86 \times 10^{+3} \\ -3.02 \times 10^{+3} \end{bmatrix}, \quad (18)$$

$$B_3 = \begin{bmatrix} +4.67 \times 10^{+2} \\ -1.35 \times 10^{+3} \\ -1.21 \times 10^{-3} \\ +1.02 \times 10^{-3} \end{bmatrix}, C_3 = 2.03 \times 10^{-4}$$

For this example, the implicit power iteration converges after 12 iteration steps. In the last iteration the calculated values for the coefficients are:

$$Q_{11} = \begin{bmatrix} +5.83 \times 10^{-1} \\ +8.11 \times 10^{-1} \\ +1.00 \times 10^{-6} \\ -1.09 \times 10^{-6} \end{bmatrix}, Q_{12} = \begin{bmatrix} -1.06 \times 10^{+9} \\ +2.77 \times 10^{+9} \\ +7.79 \times 10^{+2} \\ -5.98 \times 10^{+2} \end{bmatrix}, \quad (19)$$

$$B_{12} = \begin{bmatrix} +1.23 \times 10^{+2} \\ -1.12 \times 10^{+3} \\ -1.19 \times 10^{-3} \\ +1.14 \times 10^{-3} \end{bmatrix}, C_{12} = 2.18 \times 10^{-4}$$

Therefore, the approximated quadratic polynomial function is:

$$\hat{I}out = \hat{f}(W, L, \Delta V_{th1}, \Delta V_{th2}) = \qquad(20)$$

$$\begin{bmatrix} W \\ L \\ \Delta V_{th1} \\ \Delta V_{th2} \end{bmatrix}^T \cdot (Q_{12} Q_{11}^T) \cdot \begin{bmatrix} W \\ L \\ \Delta V_{th1} \\ \Delta V_{th2} \end{bmatrix} + B_{12}^T \cdot \begin{bmatrix} W \\ L \\ \Delta V_{th1} \\ \Delta V_{th2} \end{bmatrix} + C_{12} = \begin{bmatrix} W \\ L \\ \Delta V_{th1} \\ \Delta V_{th2} \end{bmatrix}^T \cdot$$

$$\begin{bmatrix} -6.02\times10^{+8} & -8.62\times10^{+8} & -1.06\times10^{+3} & +1.16\times10^{+3} \\ +1.61\times10^{+9} & +2.24\times10^{+9} & +2.79\times10^{+3} & -3.04\times10^{+3} \\ +4.54\times10^{+2} & +6.32\times10^{+2} & +7.84\times10^{-4} & -8.55\times10^{-4} \\ -3.49\times10^{+2} & -4.86\times10^{+2} & -6.02\times10^{-4} & +6.57\times10^{-4} \end{bmatrix} \cdot$$

$$\begin{bmatrix} W \\ L \\ \Delta V_{th1} \\ \Delta V_{th2} \end{bmatrix} + \begin{bmatrix} +1.23\times10^{+2} \\ -1.12\times10^{+3} \\ -1.19\times10^{-3} \\ +1.14\times10^{-3} \end{bmatrix} \cdot \begin{bmatrix} W \\ L \\ \Delta V_{th1} \\ \Delta V_{th2} \end{bmatrix} + 2.18\times10^{-4}$$

Within the local design space (shown in FIG. 9), 30 sampling points are randomly selected for W and L. Given the quadratic polynomial function in equation 20, APEX is utilized to compute ΔIout at each of these 30 sampling points. In this example, ΔIout is defined as the distance between the 1% point and the 99% point of the cumulative distribution function as illustrated in FIG. 8B. Table 4 lists the 30 sampling points utilized in this posynomial fitting process. Again, one of skill in the art will appreciate that the selection of 30 sampling points is merely an example and is not intended to limit the present invention. Alternative embodiments of the present invention utilize a greater or lesser number of sampling points depending on the particular applications.

TABLE 4

| Index | W (m) | L (m) | ΔIout (A) |
|---|---|---|---|
| 1 | 2.1947E−07 | 1.8421E−07 | 1.5056E−04 |
| 2 | 2.0027E−07 | 2.1896E−07 | 1.2204E−04 |
| 3 | 2.0507E−07 | 2.1478E−07 | 1.2582E−04 |
| 4 | 2.0964E−07 | 2.1155E−07 | 1.2887E−04 |
| 5 | 1.9526E−07 | 1.8630E−07 | 1.4550E−04 |
| 6 | 2.1649E−07 | 1.9936E−07 | 1.3889E−04 |
| 7 | 1.9132E−07 | 1.9285E−07 | 1.4007E−04 |
| 8 | 2.0811E−07 | 2.0806E−07 | 1.3123E−04 |
| 9 | 2.0571E−07 | 1.9649E−07 | 1.3946E−04 |
| 10 | 2.1386E−07 | 2.0248E−07 | 1.3620E−04 |
| 11 | 1.9834E−07 | 1.9864E−07 | 1.3679E−04 |
| 12 | 1.8426E−07 | 1.8115E−07 | 1.4772E−04 |
| 13 | 2.1813E−07 | 1.9446E−07 | 1.4276E−04 |
| 14 | 2.1585E−07 | 2.1849E−07 | 1.2463E−04 |
| 15 | 1.8104E−07 | 2.1600E−07 | 1.2144E−04 |
| 16 | 2.1088E−07 | 2.0598E−07 | 1.3317E−04 |
| 17 | 2.0361E−07 | 1.8718E−07 | 1.4605E−04 |
| 18 | 1.9397E−07 | 2.0715E−07 | 1.2986E−04 |
| 19 | 2.0137E−07 | 2.0068E−07 | 1.3572E−04 |
| 20 | 1.8830E−07 | 1.9161E−07 | 1.4055E−04 |
| 21 | 2.0697E−07 | 2.0463E−07 | 1.3361E−04 |
| 22 | 1.8948E−07 | 1.8213E−07 | 1.4775E−04 |
| 23 | 1.9686E−07 | 1.9562E−07 | 1.3882E−04 |
| 24 | 1.8544E−07 | 2.1226E−07 | 1.2485E−04 |
| 25 | 1.8273E−07 | 2.1057E−07 | 1.2570E−04 |
| 26 | 1.8789E−07 | 1.8863E−07 | 1.4270E−04 |
| 27 | 1.9912E−07 | 1.8374E−07 | 1.4795E−04 |
| 28 | 1.9287E−07 | 2.1348E−07 | 1.2502E−04 |
| 29 | 1.8264E−07 | 1.9058E−07 | 1.4049E−04 |
| 30 | 2.1325E−07 | 2.0339E−07 | 1.3543E−04 |

Utilizing the sampling points shown in Table 4, implicit power iteration is used to fit a quadratic posynomial function for ΔIout, i.e.:

$$\Delta \hat{I}out = \hat{g}(W, L) = \begin{bmatrix} W^{-1} \\ L^{-1} \\ W \\ L \end{bmatrix}^T \cdot (Q_k Q_{k-1}^T) \cdot \begin{bmatrix} W^{-1} \\ L^{-1} \\ W \\ L \end{bmatrix} + B_k^T \cdot \begin{bmatrix} W^{-1} \\ L^{-1} \\ W \\ L \end{bmatrix} + C_k \qquad(21)$$

where, for a posynomial function, all elements in $Q_k Q_{k-1}^T$ and $B_k$ and $C_k$ are positive.

In equation 21, $Q_k Q_{k-1}^T \in R^{4\times 4}$. Therefore, a vector $Q_0 \in R^{4\times 1}$ is selected as the initial vector for implicit power iteration. For purposes of illustration:

$$Q_0 = \begin{bmatrix} 1 \\ 1 \\ 1 \\ 1 \end{bmatrix} \qquad(22)$$

After the first implicit power iteration, the calculated values for the coefficients are:

$$Q_0 = \begin{bmatrix} +5.00\times10^{-1} \\ +5.00\times10^{-1} \\ +5.00\times10^{-1} \\ +5.00\times10^{-1} \end{bmatrix}, Q_1 = \begin{bmatrix} +1.40\times10^{-23} \\ +9.34\times10^{-24} \\ +3.59\times10^{-5} \\ +2.69\times10^{-10} \end{bmatrix}, \qquad(23)$$

$$B_1 = \begin{bmatrix} +1.30\times10^{-16} \\ +2.58\times10^{-11} \\ +6.33\times10^{+1} \\ +7.58\times10^{-4} \end{bmatrix}, C_1 = -4.24\times10^{-5}$$

After the second implicit power iteration, the calculated values for the coefficients are:

$$Q_1 = \begin{bmatrix} +3.89\times10^{-19} \\ +2.59\times10^{-19} \\ +1.00\times10^{+0} \\ +6.56\times10^{-6} \end{bmatrix}, Q_2 = \begin{bmatrix} +2.79\times10^{-7} \\ +1.79\times10^{-5} \\ +0.00\times10^{+0} \\ +0.00\times10^{+0} \end{bmatrix}, \qquad(24)$$

$$B_2 = \begin{bmatrix} +3.99\times10^{-18} \\ +2.58\times10^{-11} \\ +6.33\times10^{+1} \\ +2.22\times10^{-5} \end{bmatrix}, C_2 = -2.47\times10^{-5}$$

After the third implicit power iteration, the calculated values for the coefficients are:

$$Q_2 = \begin{bmatrix} +1.55\times10^{-2} \\ +9.99\times10^{-1} \\ +0.00\times10^{+0} \\ +0.00\times10^{+0} \end{bmatrix}, Q_3 = \begin{bmatrix} +4.49\times10^{-25} \\ +9.34\times10^{-26} \\ +1.79\times10^{-5} \\ +1.29\times10^{-10} \end{bmatrix}, \qquad(25)$$

$$B_3 = \begin{bmatrix} +2.25\times10^{-18} \\ +2.58\times10^{-11} \\ +6.33\times10^{+1} \\ +1.25\times10^{-5} \end{bmatrix}, C_3 = -2.47\times10^{-5}$$

For this example, the implicit power iteration converges after seven iteration steps. In the last iteration the calculated values for the coefficients are:

$$Q_6 = \begin{bmatrix} +1.00\times10^{+0} \\ +3.59\times10^{-7} \\ +0.00\times10^{+0} \\ +0.00\times10^{+0} \end{bmatrix}, Q_7 = \begin{bmatrix} +2.17\times10^{-22} \\ +6.16\times10^{-22} \\ +4.94\times10^{+1} \\ +2.69\times10^{-9} \end{bmatrix}, \quad (26)$$

$$B_7 = \begin{bmatrix} +3.22\times10^{-15} \\ +2.59\times10^{-11} \\ +6.46\times10^{+1} \\ +1.62\times10^{-2} \end{bmatrix}, C_7 = -4.94\times10^{+1}$$

Therefore, the approximated quadratic posynomial function is:

$$\Delta Iout = g(W, L) = \begin{bmatrix} W^{-1} \\ L^{-1} \\ W \\ L \end{bmatrix}^T \cdot (Q_7 Q_6^T) \cdot \begin{bmatrix} W^{-1} \\ L^{-1} \\ W \\ L \end{bmatrix} + B_7^T \cdot \begin{bmatrix} W^{-1} \\ L^{-1} \\ W \\ L \end{bmatrix} + C_7 = \quad (27)$$

$$\begin{bmatrix} W^{-1} \\ L^{-1} \\ W \\ L \end{bmatrix}^T \cdot \begin{bmatrix} 2.17\times10^{-22} & 7.82\times10^{-29} & +0.00\times10^{+0} & +0.00\times10^{+0} \\ 6.16\times10^{-22} & 2.21\times10^{-28} & +0.00\times10^{+0} & +0.00\times10^{+0} \\ 4.94\times10^{+1} & 1.77\times10^{-5} & +0.00\times10^{+0} & +0.00\times10^{+0} \\ 2.69\times10^{-9} & 9.71\times10^{-16} & +0.00\times10^{+0} & +0.00\times10^{+0} \end{bmatrix} \cdot \begin{bmatrix} W^{-1} \\ L^{-1} \\ W \\ L \end{bmatrix} +$$

$$\begin{bmatrix} +3.22\times10^{-15} \\ +2.59\times10^{-11} \\ +6.46\times10^{+1} \\ +1.62\times10^{-2} \end{bmatrix}^T \cdot \begin{bmatrix} W^{-1} \\ L^{-1} \\ W \\ L \end{bmatrix} - 4.94\times10^{+1}$$

Given the approximated function $\Delta Iout = g(W,L)$ in equation 27 and the local design space shown in FIG. 9, $\Delta Iout$ is minimized in the pre-defined local design space. Such an optimization problem is formulated as:

Minimize $g(W, L)$

Subject To $0.18~\mu m \leq W \leq 0.22~\mu m$ $0.18~\mu m \leq L \leq 0.22~\mu m$ (28)

It should be noted that the function in equation 27 is not exactly a posynomial, since the constant term C is negative. However, when g(W,L) is minimized, the constant term C has no impact on the optimization solution. In other words, the optimization problem in equation 28 is equivalent to:

Minimize $g(W, L) - C$

Subject To $0.18~\mu m \leq W \leq 0.22~\mu m$ $0.18~\mu m \leq L \leq 0.22~\mu m$ (29)

since solving equations 28 and 29 result in the same optimal values for W and L. Therefore, equation 29 is used to find the optimal values of W and L, where the constant term C is removed and the cost function g(W,L)−C only contains quadratic and linear posynomial terms.

The optimization problem in equation 29 is solved by geometric programming as described above. Table 5 shows the optimal design variables and circuit performances that are calculated using a geometric programming process.

TABLE 5

| Type | Name | Value |
| --- | --- | --- |
| Design Variable | W | 0.18 μm |
|  | L | 0.22 μm |
| Circuit Performance | ΔIout | 119 μA |

Comparing Tables 2 and 5, it is observed that the values of W and L have changed from the initial design values. In other words, starting from the initial design in Table 2, the ROAD tool defines a local design space (shown in FIG. 9) and then finds the optimal design in the local design space (shown in Table 5). In an iterative manner, the ROAD tool is subsequently used to define a new local design space based on the values in Table 5, repeat the polynomial fitting, worst-case analysis, posynomial fitting, and geometric programming process to find the optimal design in the new local design space. This process is applied in an iterative manner until the improvement in subsequent iterations decreases to a value below a predetermined threshold. Moreover, as illustrated in FIG. 2B, the local design space is decreased in size during the course of the iterations, thereby improving the polynomial and posynomial fitting accuracy. Table 6 shows the optimal design variables and circuit performances obtained after the ROAD tool is applied in this iterative manner.

TABLE 6

| Iteration Number | Design Space Size | W (m) | L (m) | ΔIout (A) |
| --- | --- | --- | --- | --- |
| 1 | ±10% | 1.8003E−07 | 2.1996E−07 | 1.1926E−04 |
| 2 | ±10% | 1.6206E−07 | 2.4192E−07 | 1.1155E−04 |
| 3 | ±10% | 1.6004E−07 | 2.6603E−07 | 1.0145E−04 |
| 4 | ±10% | 1.6003E−07 | 2.9252E−07 | 9.2313E−05 |
| 5 | ±10% | 1.6003E−07 | 3.2164E−07 | 8.3959E−05 |
| 6 | ±10% | 1.6004E−07 | 3.5365E−07 | 7.6388E−05 |
| 7 | ±10% | 1.6007E−07 | 3.8882E−07 | 6.9534E−05 |
| 8 | ±10% | 1.6008E−07 | 4.2748E−07 | 6.3284E−05 |
| 9 | ±10% | 1.6011E−07 | 4.6995E−07 | 5.7681E−05 |

TABLE 6-continued

| Iteration Number | Design Space Size | W (m) | L (m) | ΔIout (A) |
|---|---|---|---|---|
| 10 | ±10% | 1.6012E−07 | 5.1663E−07 | 5.2560E−05 |
| 11 | ±10% | 1.6055E−07 | 5.6724E−07 | 4.7942E−05 |
| 12 | ±10% | 1.6067E−07 | 6.2275E−07 | 4.3800E−05 |
| 13 | ±10% | 1.6077E−07 | 6.8361E−07 | 4.0036E−05 |
| 14 | ±10% | 1.6085E−07 | 7.5038E−07 | 3.6618E−05 |
| 15 | ±10% | 1.6094E−07 | 8.2362E−07 | 3.3519E−05 |
| 16 | ±10% | 1.6105E−07 | 9.0398E−07 | 3.0707E−05 |
| 17 | ±10% | 1.6124E−07 | 9.9224E−07 | 2.8150E−05 |
| 18 | ±10% | 1.6270E−07 | 9.9608E−07 | 2.7604E−05 |
| 19 | ±10% | 1.6045E−07 | 9.9885E−07 | 2.7516E−05 |
| 20 | ±10% | 1.6041E−07 | 9.9885E−07 | 2.7502E−05 |
| 21 | ±5% | 1.6309E−07 | 9.9945E−07 | 2.7343E−05 |
| 22 | ±5% | 1.6203E−07 | 9.9839E−07 | 2.7328E−05 |
| 23 | ±5% | 1.6361E−07 | 9.9942E−07 | 2.7349E−05 |
| 24 | ±5% | 1.6390E−07 | 9.9917E−07 | 2.7346E−05 |
| 25 | ±2.5% | 1.6171E−07 | 9.9810E−07 | 2.7204E−05 |
| 26 | ±2.5% | 1.6094E−07 | 9.9825E−07 | 2.7105E−05 |
| 27 | ±2.5% | 1.6083E−07 | 9.9826E−07 | 2.7104E−05 |
| 28 | ±2.5% | 1.6082E−07 | 9.9826E−07 | 2.7104E−05 |
| 29 | ±1.25% | 1.6048E−07 | 9.9859E−07 | 2.7049E−05 |
| 30 | ±0.625% | 1.6042E−07 | 9.9535E−07 | 2.7131E−05 |

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A computer implemented method of performing projection based polynomial fitting, the method comprising:
    generating a plurality of sampling points as a function of variables;
    forming a polynomial model template representative of the plurality of sampling points, wherein the polynomial model template comprises at least one polynomial coefficient;
    forming a low-rank matrix using implicit power iteration to approximate the polynomial coefficient, wherein forming the low-rank matrix comprises using the steps of:
        (a) determining an initial estimate of a product of a singular value and a singular vector associated with the low-rank matrix, wherein the singular value is a first dominant singular value and the singular vector is at least one of a first dominant left singular vector and a first dominant right singular vector,
        (b) using the determined initial estimate of the product of the singular value and the singular vector to determine a second estimate of the product of the singular value and the singular vector, and
        (c) repeating steps (a) and (b) until a difference between a first error between the polynomial model template and the plurality of sampling points and a second error between the polynomial model template and the plurality of sampling points is reduced to a predetermined value; and
    providing a circuit design based on the low-rank matrix utilizing a computer-aided design tool.

2. The method of claim 1 further comprising determining the first error at a step previous to determining the second error.

3. The method of claim 2 wherein the first error is determined at a penultimate step and the second error is determined at a final step.

4. The method of claim 1 wherein variables comprise at least one of design variables, process parameters, or environmental parameters.

5. The method of claim 4 wherein the process parameters comprise process variation.

6. The method of claim 4 wherein the environmental parameters comprise environmental variation.

7. The method of claim 1 wherein the polynomial model template comprises a quadratic polynomial equation.

8. The method of claim 1 wherein the polynomial coefficient is a quadratic coefficient matrix.

9. A computer program product stored on a computer-readable storage medium configured to store instructions operational by a processor of a computer system for performing projection based polynomial fitting, the computer program product comprising:
    code for generating a plurality of sampling points as a function of variables;
    code for forming a polynomial model template representative of the plurality of sampling points, wherein the polynomial model template comprises at least one polynomial coefficient; and
    code for forming a low-rank matrix using implicit power iteration to approximate the polynomial coefficient, wherein the code for forming a low-rank matrix comprises:
        (a) code for determining an initial estimate of a product of a singular value and a singular vector associated with the low-rank matrix, wherein the singular value is a first dominant singular value and the singular vector is at least one of a first dominant left singular vector and a first dominant right singular vector,
        (b) code for using the determined initial estimate of the product of the singular value and the singular vector to determine a second estimate of the product of the singular value and the singular vector, and
        (c) code for repeating steps (a) and (b) until a difference between a first error between the polynomial model template and the plurality of sampling points and a second error between the polynomial model template and the plurality of sampling points is reduced to a predetermined value.

10. The computer program product of claim 9 further comprising code for determining the first error at a step previous to determining the second error.

11. The computer program product of claim 10 wherein the first error is determined at a penultimate step and the second error is determined at a final step.

12. The computer program product of claim 9 wherein variables comprise at least one of design variables, process parameters, or environmental parameters.

13. The computer program product of claim 12 wherein the process parameters comprise process variation.

14. The computer program product of claim 12 wherein the environmental parameters comprise environmental variation.

15. The computer program product of claim 9 wherein the polynomial model template comprises a quadratic polynomial equation.

16. The computer program product of claim 9 wherein the polynomial coefficient is a quadratic coefficient matrix.

* * * * *

UNITED STATES PATENT AND TRADEMARK OFFICE
CERTIFICATE OF CORRECTION

PATENT NO. : 7,669,150 B2  Page 1 of 1
APPLICATION NO. : 11/245892
DATED : February 23, 2010
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Seventh Day of December, 2010

David J. Kappos
*Director of the United States Patent and Trademark Office*